(12) United States Patent
Veltri et al.

(10) Patent No.: US 6,641,102 B2
(45) Date of Patent: Nov. 4, 2003

(54) BEVERAGE CONTAINER SUPPORT APPARATUS

(76) Inventors: Jeffrey Allan Veltri, 2365 Duncaster Drive, Burlington (CA), L7P 3V9; Paul Joseph Taillefer, 540 Russell Hill Road, Suite 403, Toronto, Ontario (CA), M5P 2T3

( * ) Notice: Subject to any disclaimer, the term of this patent is extended or adjusted under 35 U.S.C. 154(b) by 0 days.

(21) Appl. No.: 09/912,531

(22) Filed: Jul. 26, 2001

(65) Prior Publication Data

US 2002/0023992 A1 Feb. 28, 2002

(51) Int. Cl.$^7$ .................................................. A47K 1/08
(52) U.S. Cl. ...................... 248/311.2; 224/926; 220/737
(58) Field of Search ............................. 248/311.2, 314; 224/42.42, 42.45 R, 926; 220/737

(56) References Cited

U.S. PATENT DOCUMENTS

| | | |
|---|---|---|
| 3,980,282 A | 9/1976 | Burch et al. |
| 4,256,236 A | 3/1981 | Haase |
| 4,721,216 A | 1/1988 | Kinder |
| 4,723,689 A | 2/1988 | Vallos et al. |
| 4,964,536 A | 10/1990 | Vestering |
| 4,974,744 A | 12/1990 | Shanklin et al. |
| 4,979,657 A | 12/1990 | Espiritu |
| 5,048,733 A | 9/1991 | Nagy |
| 5,056,659 A | 10/1991 | Howes et al. |
| 5,056,681 A | 10/1991 | Howes |
| 5,114,108 A * | 5/1992 | Olschansky .................. 206/549 |
| 5,117,980 A | 6/1992 | Ionides |
| 5,150,811 A | 9/1992 | Kelston |
| 5,180,088 A * | 1/1993 | de Angeli ................. 224/42.42 |
| 5,259,580 A | 11/1993 | Anderson et al. |
| 5,292,021 A | 3/1994 | Lyon |
| 5,330,146 A | 7/1994 | Spykerman |
| 5,421,459 A * | 6/1995 | Mazzotti ..................... 206/549 |
| 5,487,519 A | 1/1996 | Grabowski |
| 5,490,653 A | 2/1996 | Ingwersen |
| 5,524,958 A | 6/1996 | Wieczorek et al. |
| 5,645,196 A | 7/1997 | Hancuff |
| 5,690,307 A | 11/1997 | Joyce |
| 5,704,519 A | 1/1998 | Crosnier et al. |
| 5,704,579 A | 1/1998 | Celentino et al. |
| 5,897,041 A * | 4/1999 | Ney et al. ................ 224/926 X |
| 5,915,561 A | 6/1999 | Lorenzana et al. |
| 5,941,491 A | 8/1999 | Plocher et al. |
| 5,997,082 A | 12/1999 | Vincent et al. |
| 5,997,367 A | 12/1999 | Nowak et al. |
| D419,393 S * | 1/2000 | Lance .......................... D7/619 |
| 6,024,624 A | 2/2000 | Lee |
| 6,041,961 A | 3/2000 | Farrell |
| 6,065,729 A | 5/2000 | Anderson |
| 6,085,953 A | 7/2000 | Bober et al. |
| 6,099,062 A * | 8/2000 | Siegel ..................... 224/926 X |
| 6,315,153 B1 * | 11/2001 | Osborn ......................... 220/737 |

FOREIGN PATENT DOCUMENTS

| | | |
|---|---|---|
| CA | 1271172 | 7/1990 |
| CA | 2000902 | 7/1992 |
| CA | 2262160 | 8/1999 |

* cited by examiner

Primary Examiner—Ramon O. Ramirez
(74) Attorney, Agent, or Firm—Mark Sajewyez; Gowling Lafleur Henderson LLP (57) ABSTRACT

An adaptor is provided and is configured to be received within a beverage container receptacle comprising a first section including a base, the base including a planar support surface. The adaptor also includes at least one sidewall extending from the support surface, wherein the sidewall is configured to provide lateral support to a beverage container, and a second section jointed to and depending from the upper section including a pedestal. There is also provided A beverage container support apparatus comprising a first section including a a planar support surface, the planar support surface including a throughbore disposed therein, and a plurality of sidewall sections extending from the planar support surface and configured to provide lateral support to a multi-sided beverage container, and a second section, depending from the first section, and including a receptacle communicating with the throughbore.

20 Claims, 8 Drawing Sheets

BEVERAGE CONTAINER SUPPORT APPARATUS

FIELD OF THE INVENTION

The present invention relates to a beverage container support apparatus and, more particularly, a beverage container support apparatus for supporting cylindrical or substantially cylindrical beverage containers as well as non-cylindrical multi-sided beverage containers.

BACKGROUND OF THE INVENTION

Motor vehicles are typically designed with beverage container holders, configured to support beverage containers, and thereby facilitate consumption of beverages by passengers. Unfortunately, typical beverage container holders of the prior art are designed to support cylindrical beverage containers, and are not particularly suitable for multi-sided beverage containers having corners, such as a milk carton.

SUMMARY OF THE INVENTION

The present invention provides an adaptor configured to be received within a beverage container receptacle comprising a first section including a base, the base including a planar support surface, and at least one sidewall extending from the support surface, wherein the sidewall is configured to provide lateral support to a beverage container and a second section jointed to and depending from the upper section including a pedestal.

The present invention also provides a beverage container support apparatus comprising a first section including a planar support surface, the planar support surface including a throughbore disposed therein, and a plurality of sidewall sections extending from the planar support surface and configured to provide lateral support to a multi-sided beverage container, and a second section, depending from the first section, and including a receptacle communicating with the throughbore.

The present invention further provides an adaptor for receiving and supporting a rectangular beverage container over a cylindrical cavity comprising a frusto-conical base, configured to be seated in the cylindrical cavity, and a rectangular support formed integral with the base and extending upwardly from the base and co-extensive therewith and defining a cavity for receiving the rectangular container therein, said rectangular support including two pairs of opposed sidewalls perpendicular with each other.

BRIEF DESCRIPTION OF THE DRAWINGS

The embodiments of the present invention are described below with reference to the accompanying drawings in which.

DETAILED DESCRIPTION

Figure 2:
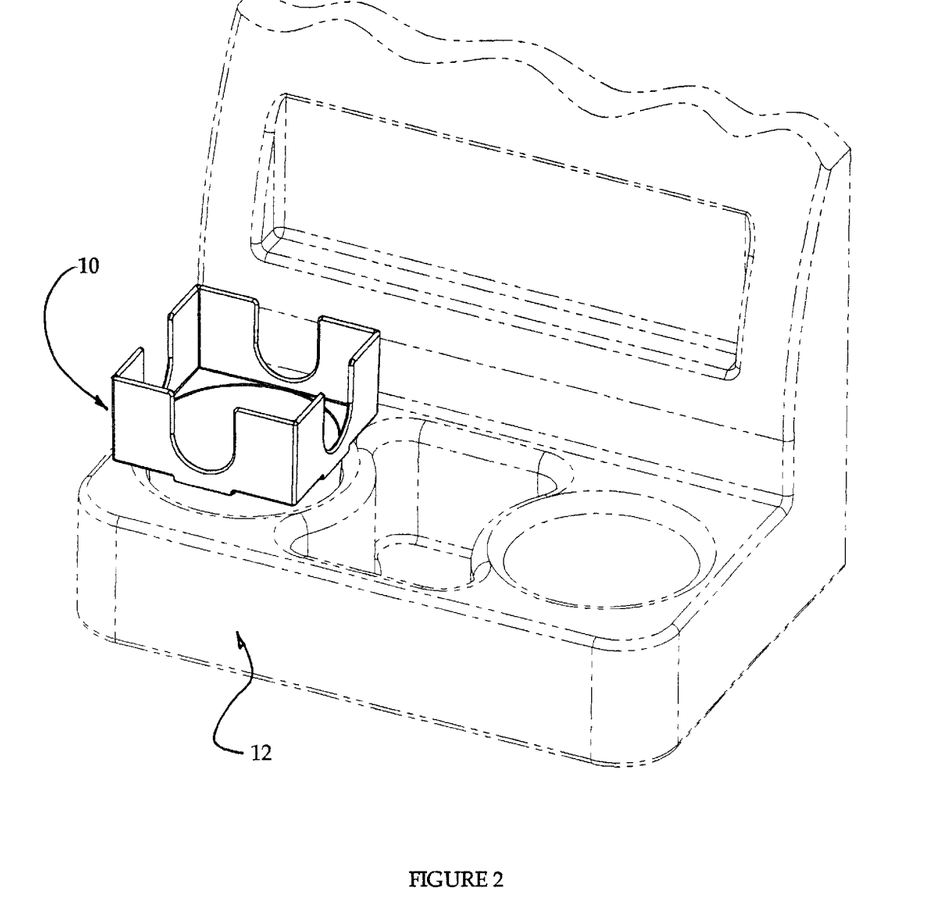
FIG. 2 is a front perspective view illustrating an embodiment of a beverage container holder apparatus of the present invention disposed within a typical vehicular beverage container holder.
Figure 3:
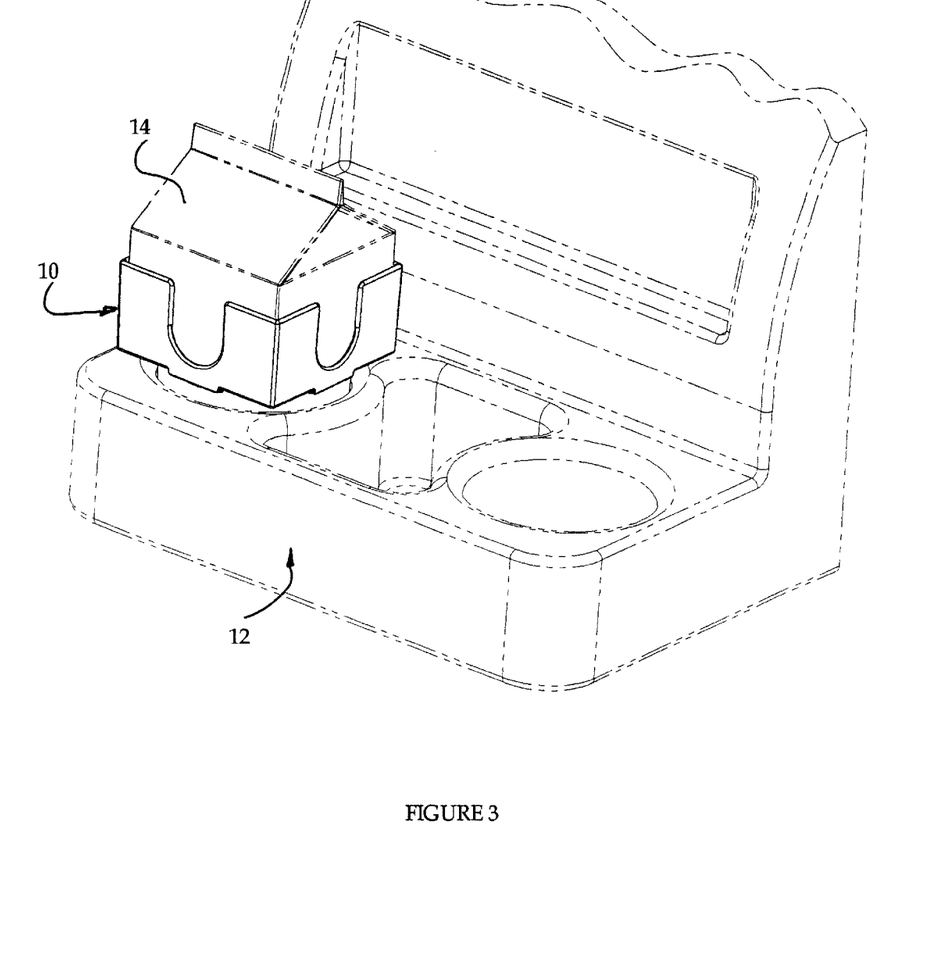
FIG. 3 is a front perspective view of an embodiment of a beverage container support apparatus of the present invention, disposed within a typical vehicular beverage container holder, and supporting a milk carton.
Figure 4:
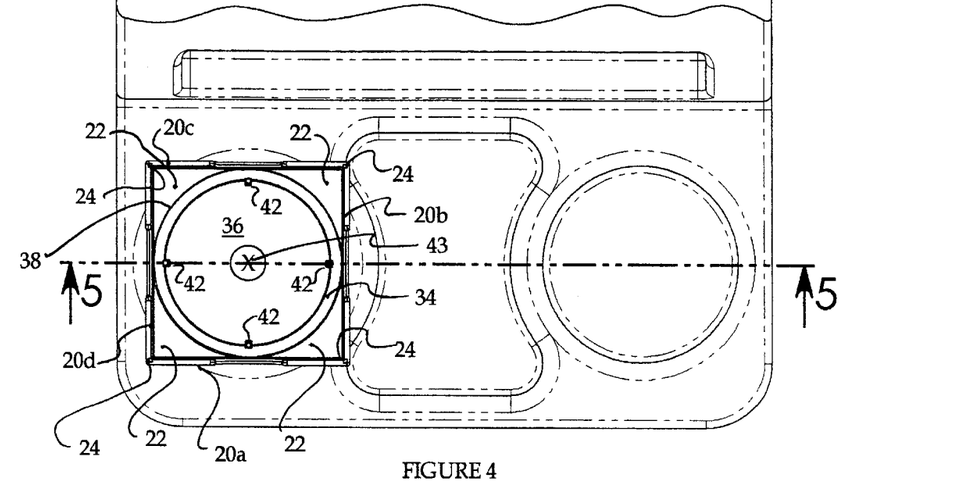
FIG. 4 is a top plan view of an embodiment of a beverage container support apparatus of the present invention, disposed within a typical vehicular beverage container holder of the prior art.
Figure 5:
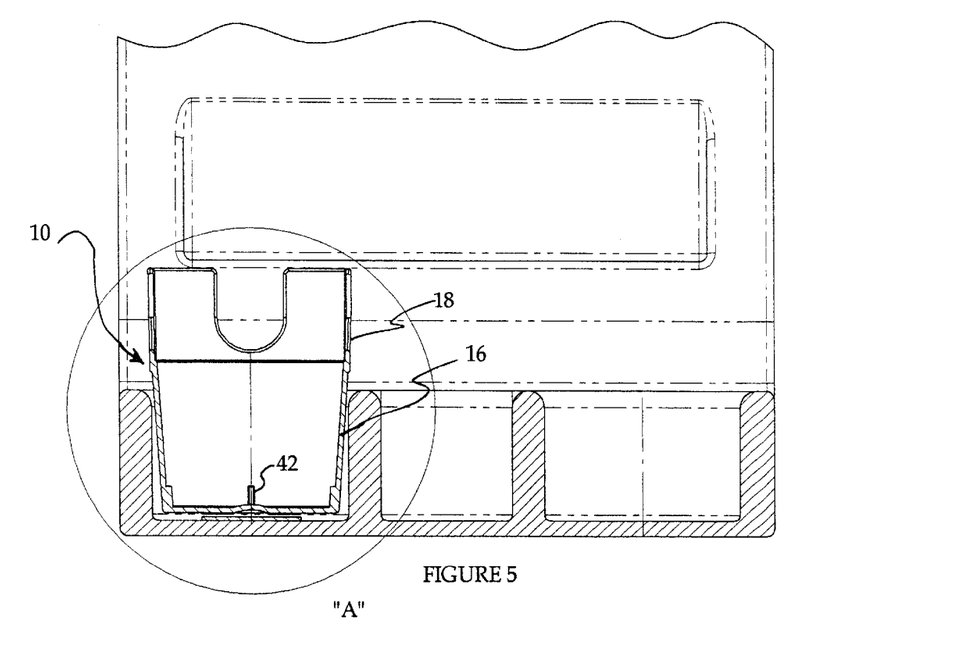
FIG. 5 is a front sectional elevation view of an embodiment of a beverage container holder apparatus of the present invention, disposed within a typical vehicular beverage container holder.
Figure 6:
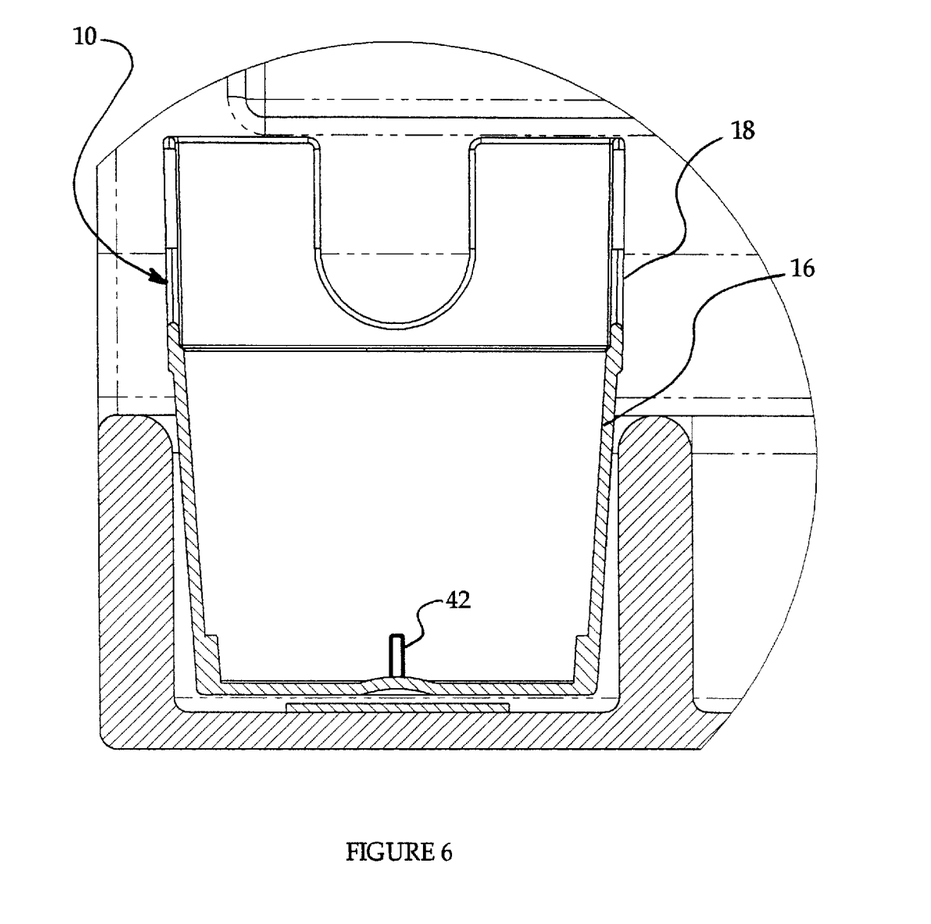
FIG. 6 is an enlarged view of detail A of FIG. 5.
Figures 7, 8, 9, 10:
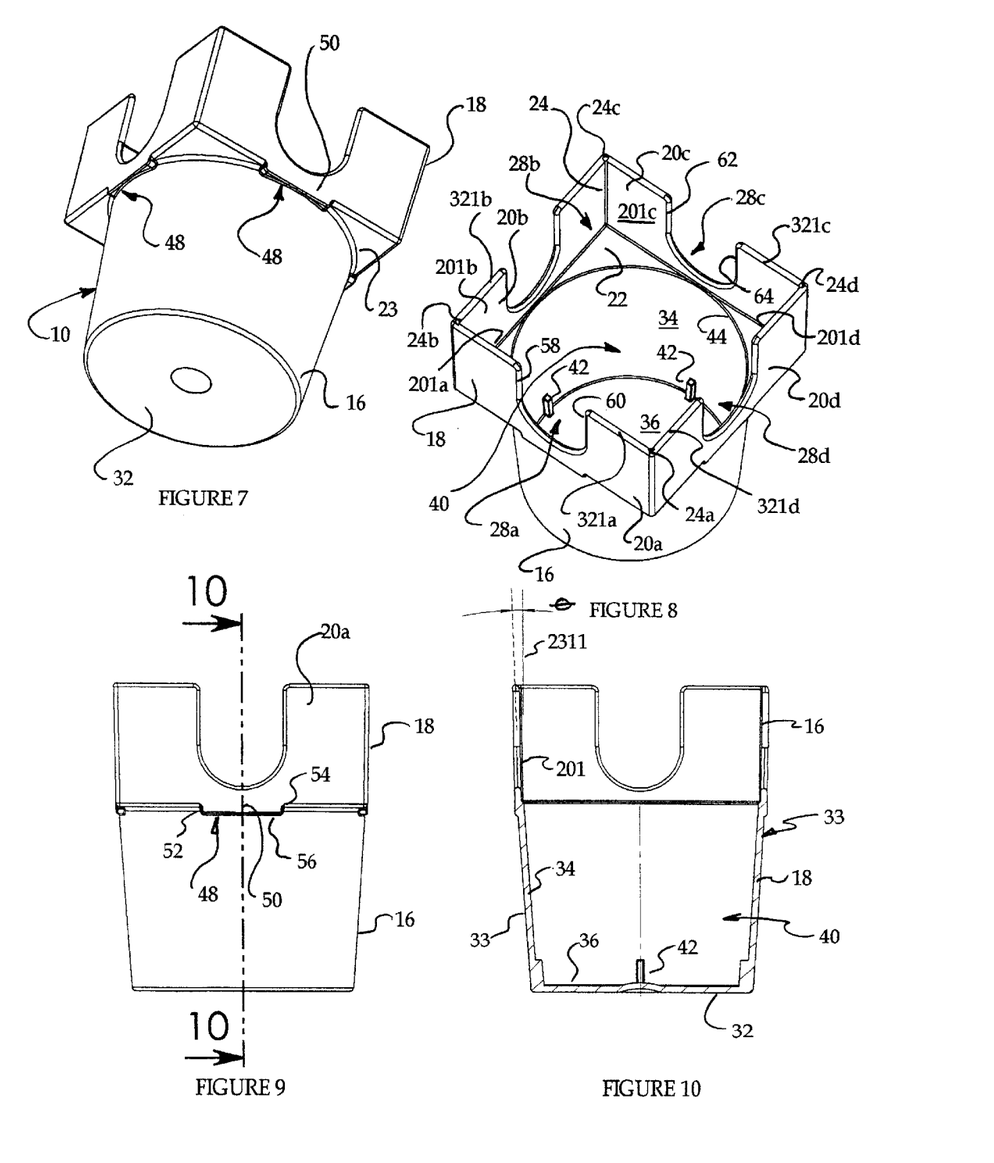
FIG. 7 is a bottom perspective view of an embodiment of a beverage container support apparatus of the present invention.
FIG. 8 is a top perspective view of an embodiment of a beverage container support apparatus of FIG. 7.
FIG. 9 is a front elevation view of the beverage container support apparatus of FIG. 7.
FIG. 10 is a front sectional elevation view of the beverage container support apparatus of FIG. 7.
Figure 11:
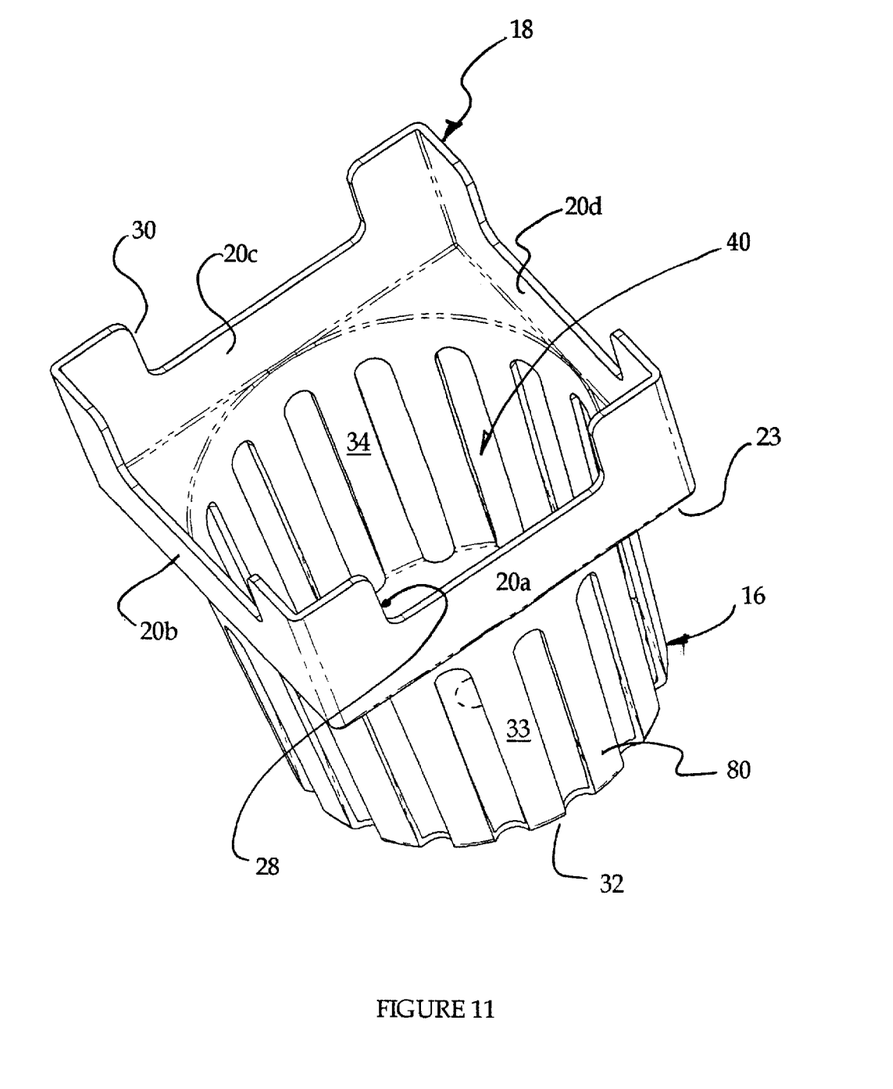
FIG. 11 is a top perspective view of another embodiment of a beverage container support apparatus of the present invention.
Figure 12:
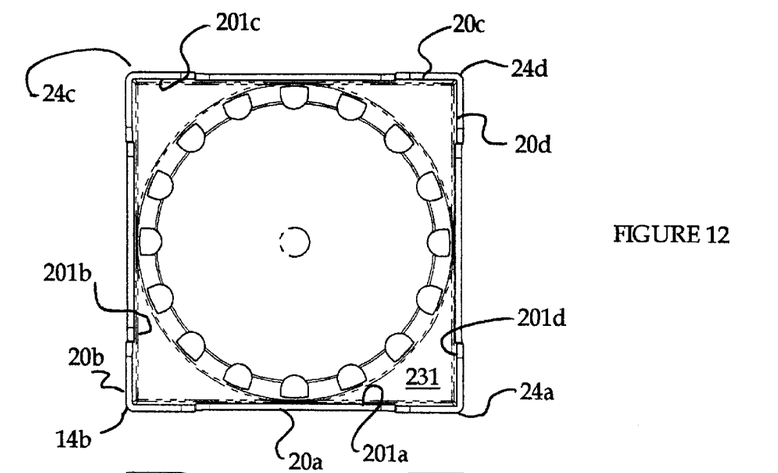
FIG. 12 is a top perspective view of the beverage container support apparatus of FIG. 11.
Figure 13:
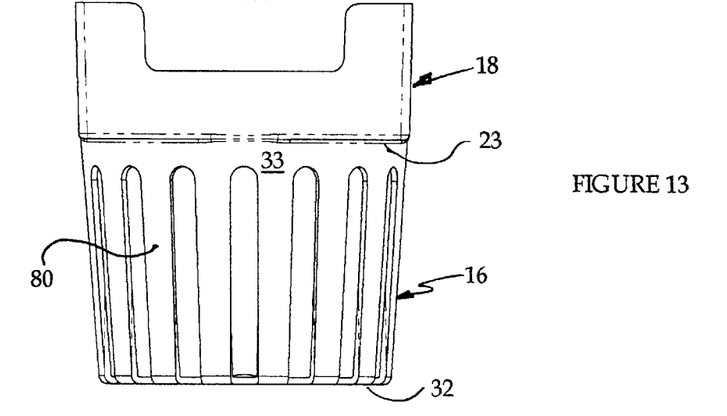
FIG. 13 is a front elevation view of the beverage container support apparatus of FIG. 11.
Figure 14:
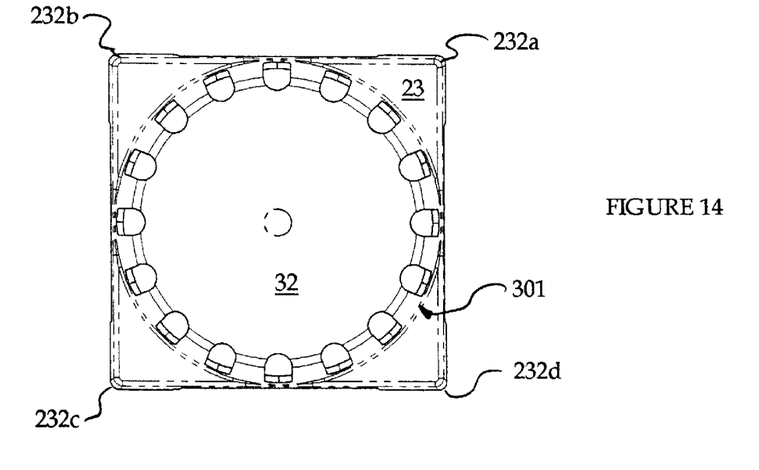
FIG. 14 is a bottom plan view of the beverage container support apparatus of FIG. 11.

FIG. 8 illustrates an embodiment of a beverage container holder apparatus 10 of the present invention. The apparatus 10 is configured for receiving and supporting a non-cylindrical, multi-sided beverage container, such as a milk carton (see FIG. 3). Non-cylindrical beverage containers are those which are not characterized by cylindrical cross-sections and/or which cannot be received within a typical beverage container holder 12 whose receptacle is characterized by a cylindrical or substantially cylindrical cross-section. In one embodiment, and referring to FIG. 2, the apparatus 10 is designed to be received within a typical beverage container holder 12. In this respect, and in this embodiment, apparatus 10 functions as an adaptor to adapt an existing beverage container holder to facilitate support of a non-cylindrical, multi-sided beverage container.

Referring to FIGS. 1 and 7–10, apparatus 10 includes a first upper section 18 joined to a second lower section 16. Section 16 is configured to be received in a typical beverage container holder 12. Section 18 is configured to support a non-cylindrical, multi-sided beverage container.

Figure 1:
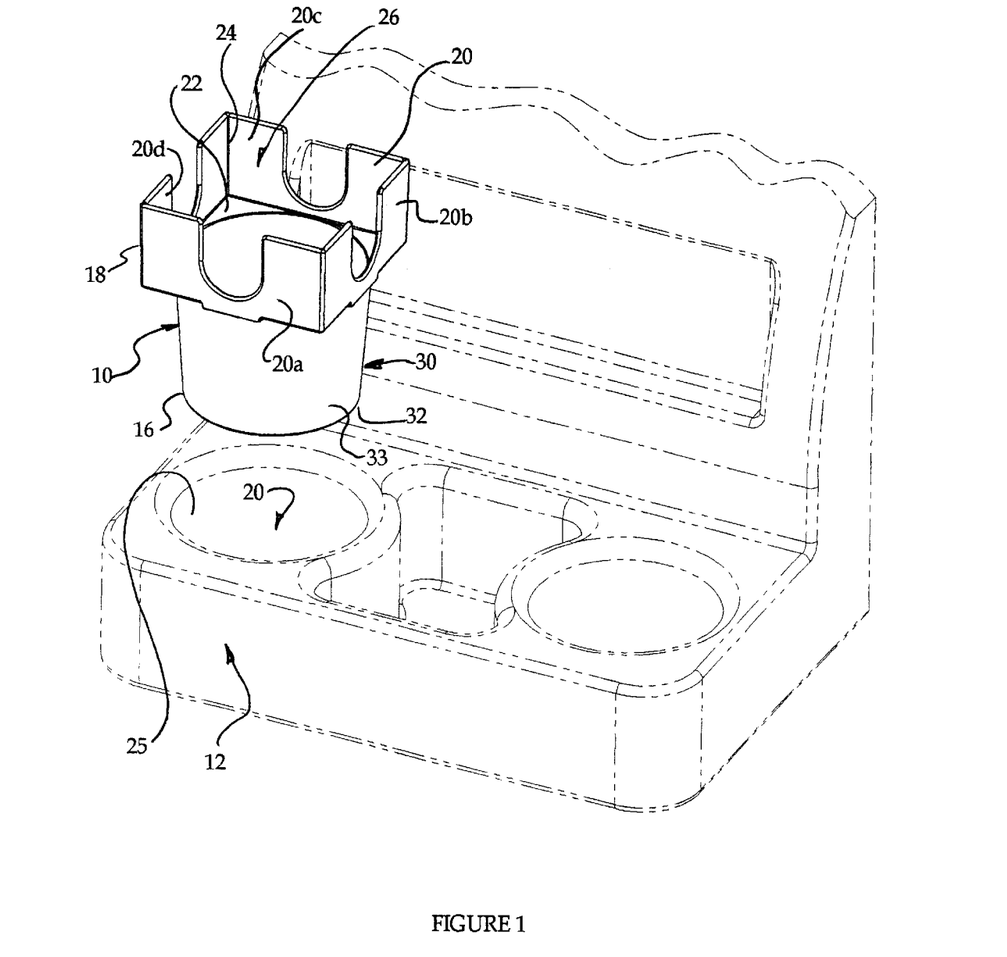
FIG. 1 is a front perspective view of an embodiment of a beverage container support apparatus of the present invention, suspended above a typical vehicular beverage container holder.

Lower section 16 is configured for insertion into a socket or receptacle 20 of a typical or conventional beverage container holder 12, thereby providing lateral stability to apparatus 10 (see FIG. 1). Beverage container holder 12 can be found in vehicles for securely supporting and holding beverage containers whilst the vehicle is in motion. In one embodiment, socket 20 is cylindrical and includes an inner sidewall 25 extending from a generally planar bottom. Lower section 16 is defined by a pedestal 30 including a base 32 and an outer sidewall 33 including a frusto-conical surface or a cylindrical surface (see FIGS. 1 and 10). In one embodiment, base 32 includes floor 36. Sidewall 33 projects or extends from base 32. In this respect, apparatus 10 is configured for reception within cylindrical socket 20.

In one embodiment, apparatus 10 can also support and hold cylindrical beverage containers. In this respect, cylindrical pedestal 30 is hollow, and open at upper end 44. Pedestal 30 includes inner sidewall 34 extending from floor 36 (see FIG. 8). Inner sidewall 34 includes a frusto-conical shaped surface. In combination, sidewall 34 and floor 36 define receptacle 40. Receptacle 40 receives insertion of cylindrical beverage containers or beverage containers comprising frusto-conical shaped sidewalls. Sidewall 34 provides lateral support to such beverage containers, while floor 36 provides vertical support to such containers.

Ribs 42 can be provided within receptacle 40 for supporting shorter containers. In one embodiment, and referring to FIGS. 4–6, 8 and 10, ribs 42 extend or project radially from inner sidewall 34 in an inwardly direction and towards the longitudinal axis 43 of receptacle 40.

Referring to FIGS. 8 and 10, upper section 18 includes a base 23 and sidewall sections 20a, 20b, 20c, 20d. Base 23 presents a planar surface 231, configured to provide vertical support for a beverage container 14. Sidewall sections 20a, 20b, 20c, 20d extend from planar surface 231, and present planar surfaces 201a, 201b, 201c, 201d respectively which are configured to provide lateral support to a beverage container 14 resting on planar surface 231. Each of planar surfaces 201a, 201b, 201c, 201d is substantially orthogonal to planar surface 231. Substantially orthogonal means that planar surfaces 201a, 201b, 201c, 201d are slightly tapered from an axis extending orthogonally from surface 231. The direction of the taper is in a direction remote from longitudinal axis 43. In one embodiment, planar surfaces 201a, 201b, 201c, 201d are disposed at an angle θ of between 1.0 and 2.5° from the vertical axis 2311 projecting orthogonally from surface 231 and in a direction remote to longitudinal axis 43. In one embodiment, sidewall sections 201a, 201b, 201c, 201d are joined to form a continuous sidewall 20 with four corners 24a, 24b, 24c, 24d. In this respect, sidewall sections 201a, 201b, 201c, 201d form a rectangular cavity, such as a square.

Referring to FIG. 8, in one embodiment, sidewall sections 20a, 20b, 20c, 20d include upper edges 321a, 321b, 321c, 321d. Opposing recesses (or cut-outs or notches) 28a, 28c and 28b, 28d are disposed within sidewall sections 321a, 321b, 321c, 321d respectively, and extend from respective upper edges 321a, 321b, 321c, 321d. Recesses 28a, 28b, 28c, 28d provide access for grasping, and removing, by hand, a beverage container 14 supported by upper section 18. In the embodiment illustrated, recesses 28a, 28b, 28c, 28d are U-shaped. Recesses 28a, 28b, 28c, 28d are particularly useful when the beverage container 14 is relatively short and does not extend or does not substantially extend above sidewall 20.

Referring to FIG. 8, where apparatus 10 is configured to additionally support cylindrical beverage containers, base 23 is provided with a throughbore 70 communicating with receptacle 40. In this respect, aapparatus 10 can be used to support non-cylindrical beverage containers by way of its upper section 18, and can also be used to support cylindrical beverage containers by way of lower section 16.

Apparatus 10 can be stacked with other apparati 10 to facilitate storage. Further, adaptor 10 includes locking means 48 to prevent upper section 18 from rotating when stacked with other adaptors 10 (see FIGS. 7 and 9). Locking means 48 includes tabs 50 configured for engaging and fitting within recesses 28a, 28c. In this respect, tabs 50 depend from base 23 of upper section 18 in a direction towards base 32 of pedestal 30. Tabs 50 are co-extensive and aligned with respective recesses 28a, 28c. Tabs 50 include substantially vertical edges 52, 54 extending or projecting from base 23 (see FIG. 9), joined by a substantially horizontal edge 56. Further, recesses 28a, 28c include respective pairs of substantially vertical inner edges 58, 60 and 62, 64 (see FIG. 8) configured for engaging and bearing against edges 52, 54, thereby locking one apparatus 10 versus another apparatus 10 such that the apparati 10 are substantially prevented from rotating relative to one another. Similarly, receptacle 40 of one apparatus 10 is configured to be received within receptacle 40 of another apparatus. To facilitate such locking action, vertical edges 52, 54 are co-extensive and aligned with edges 58, 60. Further, tabs 50 are disposed within planes which are disposed radially remote from the longitudinal axis 43 of the pedestal 30 relative to the exterior perimeter of the pedestal.

To stack apparati 10 upon each other, pedestal 30 of one apparatus 10 is received by and fitted within receptacle 40 of another apparatus 10. Simultaneously, edges 52, 54 of tabs 50 engage and bear against inner edges 58, 60 and 62, 64 of recesses 28a, 28c, respectively. By fitting tabs 50 within recesses 28a, 28c in this manner, relative rotation of apparati 10 when stacked one upon another is prevented.

The apparatus 10 can be affixed to an existing beverage container holder by hook and loop fasteners, such as VELCRO™, or by two-sided tape.

FIGS. 11–14 illustrate another embodiment of apparatus 10. In this embodiment, apparatus 10 does not include tabs 50. Further, sidewall 33 merges with sidewall sections 20a, 20b, 20c and 20d. Sidewall 33 also comprises a plurality of spaced-apart longitudinal webs 80 extending between base 32 of lower section 16 and base 23 of upper section 18. Webs 80 are flexible and resilient, to facilitate insertion into existing vehicular beverage container holders 12 and accomodate varying diameters of socket 20.

To facilitate stacking, base 23 includes radiused corners 232a, 232b, 232c, 232d. Radiused corners 232a, 232b, 232e, 232d are disposed radially remote from the longitudinal axis 43 of the pedestal 1 relative to the exterior perimeter 301 of the pedestal 30. Radiused corners 232a, 232b, 232c, 232d are co-extensive and aligned with corners 24a, 24b, 24c, 24d. Radiused corners are configured to fit within corners 24a, 24b, 24c, 24d and engage planar surfaces 201a, 201b, 201c, 201d of another apparatus 10.

Apparatus 10 can be injection molded. In one embodiment, apparatus 10 is manufactured from high impact polystyrene.

Although the disclosure describes and illustrates preferred embodiments of the invention, it is to be understood that the invention is not limited to these particular embodiments. Many variations and modifications will now occur to those skilled in the art.

What is claimed is:

1. An adaptor, for adapting a beverage container holder to effect support of non-cylindrical beverage containers, comprising:
   a beverage container support including:
   a base including an aperture, the base presenting a support surface for vertically supporting a beverage container, and also presenting a second surface opposite to the support surface; and
   a first pair of opposing sidewall sections and a second pair of opposing sidewall sections, each of the sidewall sections extending from the support surface, and each of the sidewall sections presenting an inwardly facing lateral support surface which is orthogonal to the support surface of the base, such that each of the lateral support surfaces is configured to provide lateral support to a beverage container supported on the support surface of the base, wherein at least one of the sidewall sections of the first or second pair of opposing sidewall sections includes a recess extending from an edge of the sidewall section;

at least one tab depending from the second surface, wherein the at least one tab is co-extensive and aligned with the recess;

a pedestal support defining a receptacle communicating with the aperture, the pedestal support depending from the second surface and configured to be received within the beverage container holder.

2. The adaptor as claimed in claim 1, wherein the recess is defined by opposing recess edges extending from the sidewall section edge, and wherein the tab includes opposite tab edges depending from the second surface, and wherein the tab edges are co-extensive and aligned with the recess edges.

3. The adaptor as claimed in claim 2, wherein the pedestal includes a longitudinal axis and an exterior perimeter, and wherein the tab is disposed within a plane, and wherein the plane is disposed radially from the longitudinal axis relative to the perimeter.

4. The adaptor as claimed in claim 1, wherein the at least one tab is configured to be received within the recess of an identical adaptor nested therewith.

5. The adaptor as claimed in claim 4, wherein the recess is defined by opposing recess edges extending from the sidewall section edge, and wherein each of the respective at least one tab includes opposite tab edges depending from the second surface, and wherein the tab edges are configured to bear against the recess edges of an identical adaptor.

6. The adaptor as claimed in claim 5, wherein the lateral support surface of each of the sidewall sections of the first pair of opposing sidewall sections is substantially orthogonal to the lateral support surface of each of the sidewall sections of the second pair of opposing sidewall sections.

7. The adaptor as claimed in claim 6, wherein the first pair of opposing sidewall sections is disposed between the second pair of opposing sidewall sections.

8. The adaptor as claimed in claim 7, wherein the first pair of opposing sidewall sections is joined to the second pair of opposing sidewall sections to form a continuous sidewall.

9. The adaptor as claimed in claim 8, wherein the receptacle is configured to be received within a receptacle of an identical adaptor simultaneously with the tab being received within the recess.

10. An adaptor for adapting a beverage container holder to effect support of non-cylindrical beverage containers, comprising:

a beverage container support including:
a base including an aperture, the base presenting a support surface configured for vertically supporting a first beverage container, and also presenting a second surface opposite to the support surface; and
a first pair of opposing sidewall sections and a second pair of opposing sidewall sections, each of the sidewall sections extending from the support surface and configured to provide lateral support to a beverage container supported on the support surface of the base, and a beverage container receptacle integrally joined to and depending from the second surface and communicating with the aperture in the base, and configured to be received within the beverage container holder;

wherein the receptacle is configured to receive insertion of and support a second beverage container received through the aperture.

11. The adaptor as claimed in claim 10, wherein the beverage container support is configured to support a multi-sided container.

12. The adaptor as claimed in claim 11, wherein the beverage container receptacle is configured to receive a cylindrical container.

13. The adaptor as claimed in claim 12, wherein the receptacle is configured to be received through an aperture and within a receptacle of an identical adaptor to effecting nesting of the adaptor within the identical adaptor.

14. The adaptor as claimed in claim 13, wherein the receptacle includes a floor, an inner sidewall, and an outer sidewall, and wherein each of the inner and outer sidewalls extend between the floor and the second surface of the base of the support.

15. The adaptor as claimed in claim 14, wherein each of the inner and outer sidewalls define frustoconical shaped surfaces.

16. The adaptor as claimed in claim 10, wherein the adaptor further includes locking means to prevent the beverage container support from rotating relative to a beverage container support of an identical adaptor when nested with the identical adaptor.

17. The adaptor as claimed in claim 10, wherein each of the sidewall sections of at least one of the first or second pair of sidewall sections includes a recess extending from an edge of the sidewall section for exposing a surface of the beverage container to permit grasping of the beverage container by hand when the beverage container is supported on the support surface.

18. The adaptor as claimed in claim 10, wherein the lateral support surface of each of the sidewall sections of the first pair of opposing sidewall sections is substantially orthogonal to the lateral support surface of each of the sidewall sections of the second pair of opposing sidewall sections.

19. The adaptor as claimed in claim 18 wherein the first pair of opposing sidewall sections is disposed between the second pair of opposing sidewall sections.

20. The adaptor as claimed in claim 19, wherein the first pair of opposing sidewall sections is joined to the second pair of opposing sidewall sections to form a continuous sidewall.

* * * * *

UNITED STATES PATENT AND TRADEMARK OFFICE
CERTIFICATE OF CORRECTION

PATENT NO.   : 6,641,102 B2  
DATED        : November 4, 2003  
INVENTOR(S)  : Veltri et al.

It is certified that error appears in the above-identified patent and that said Letters Patent is hereby corrected as shown below:

Title page,
After Item [65], Prior Publication Data, please insert:
-- [30] Foreign Application Priority Data
    July 26, 2000 [CA] Canada 2,314,657 --

Signed and Sealed this

Twenty-second Day of February, 2005

JON W. DUDAS
*Director of the United States Patent and Trademark Office*